United States Patent [19]
Kamikubota

[11] Patent Number: 6,091,881
[45] Date of Patent: Jul. 18, 2000

[54] VIDEO PRINTER

[75] Inventor: Masafumi Kamikubota, Asaka, Japan

[73] Assignee: Fuji Photo Film Co., Ltd., Kanagawa, Japan

[21] Appl. No.: 08/754,747

[22] Filed: Nov. 21, 1996

Related U.S. Application Data

[63] Continuation of application No. 08/575,180, Dec. 19, 1995, abandoned, which is a continuation of application No. 08/088,357, Jul. 9, 1993, abandoned.

[30] Foreign Application Priority Data

Jul. 28, 1992 [JP] Japan ................................. 4-201190
Apr. 27, 1993 [JP] Japan ................................. 5-100664

[51] Int. Cl.$^7$ ................................................ H04N 5/76
[52] U.S. Cl. .......................... 386/46; 386/96; 386/120; 358/296
[58] Field of Search .................. 386/46, 52, 96, 386/104, 105, 106, 120, 121; 348/705, 706, 373; 358/909.1, 296, 906; 396/429; H04N 5/76

[56] References Cited

U.S. PATENT DOCUMENTS

| | | | |
|---|---|---|---|
| 4,688,105 | 8/1987 | Bloch et al. ............................. | 358/342 |
| 4,845,564 | 7/1989 | Hakamada .............................. | 348/706 |
| 4,888,648 | 12/1989 | Takeuchi et al. ....................... | 358/335 |
| 5,063,452 | 11/1991 | Higurashi .............................. | 358/335 |
| 5,140,435 | 8/1992 | Suzuki et al. ........................... | 358/335 |
| 5,379,159 | 1/1995 | Lemelson .............................. | 358/906 |

*Primary Examiner*—Huy Nguyen

[57] ABSTRACT

A video printer has two video input terminals and two audio input terminals to which a video signal and an audio signal respectively are applied from a picture signal source. The input terminals are each connected to one of a first and a second selector which select the signal source. The output of the first selector associated with the video input terminals is connected to a third selector via a video amplifier and also connected to the third selector via an analog-to-digital converter, a memory for storing a video signal from the signal source, and a digital-to-analog converter. The video signal stored in the memory is sent to a thermal head under the control of a memory control and printed on a recording medium thereby. The output of the third selector is connected to a video output terminal, so that the video signal selected by the third selector is outputted. The output of the second selector is connected to an audio output terminal via an audio amplifier. Hence, the audio signal applied to either of the audio input terminals is amplified and then fed out via the audio output terminal.

8 Claims, 5 Drawing Sheets

VIDEO PRINTER

This application is a continuation, of application Ser. No. 08/575,180 filed on Dec. 19, 1995, now abandoned which was a continuation of application Ser. No. 08/088,357 filed on Jul. 9, 1993, now abandoned.

BACKGROUND OF THE INVENTION

1. Field of the Invention

The present invention relates to a video printer connectable to a television (TV) receiver, video camera, video cassette recorder, laser disk (LD) player or similar picture signal source for producing a hard copy of a picture fed from the signal source.

2. Description of the Related Art

Generally, a video printer receives an analog video signal in the from of three separated color signals, e.g., red (R), green (G) and blue (B) signals from a picture signal source and transforms it to digital video data. One frame of digital video data is written to a memory and then transferred to a thermal head, one print line at a time. In response, the thermal head prints an image represented by the video data on a paper or similar recording medium. At the same time, the video data stored in the memory are again converted to an analog video signal and sent to a TV monitor (receiver) or similar equipment which uses the video printer in synchronism with synchronizing signals included in a TV signal. Therefore, a person can manipulate the video printer to adjust the quality of the picture to print while watching the picture actually appearing on the TV monitor. In this manner, the video printer is connected between the picture signal source and the TV monitor. A conventional video printer, of course, has video terminals, but it lacks audio terminals.

Specifically, a picture signal source of the kind described generates an audio signal simultaneously with a video signal. However, an audio signal cable for transmitting the audio signal from the signal source has to be directly connected to the TV monitor, by-passing the video printer, since the conventional video printer lacks audio terminals, as mentioned above. Only a video signal cable assigned to the video signal is connected to the TV monitor by way of the video printer.

The video printer has a housing which may be of a size, particularly a width, matching the size of an LD player, video cassette recorder or similar signal source or the size of a TV monitor so as to accommodate all of such equipment in a single rack. However, the problem with the conventional video printer is that a video signal cable and an audio signal cable extending from the signal source have to be respectively connected to the video printer and the TV monitor due to the terminal arrangement described above. Specifically, since the audio signal cable from the signal source has to be connected to the TV monitor over the video printer, the arrangement of the cables is disorderly. Moreover, to use the video printer, it is necessary for the operator to rearrange the cable connection by removing and inserting connectors, resulting in troublesome operations.

SUMMARY OF THE INVENTION

It is therefore an object of the present invention to provide a video printer which can be connected to a video and audio signal source and equipment to use the printer without resorting to complicated wiring or rewiring.

In accordance with the present invention, a video printer for recording a picture in a recording medium by receiving a first video signal from a signal source has a video signal input terminal connectable to the signal source for receiving the first video signal. An audio signal input terminal is connectable to the signal source for receiving an audio signal from the signal source. A recording circuit produces a second video signal representative of a picture to record in the recording medium from the first video signal and records the picture in the recording medium. An outputting circuit has a video signal output terminal connectable to equipment which uses the video printer. The outputting circuit selectively outputs either of the first and second video signals via the video signal output terminal. An audio signal output terminal is connectable to the equipment for outputting the audio signal applied to the audio signal input terminal.

BRIEF DESCRIPTION ON OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
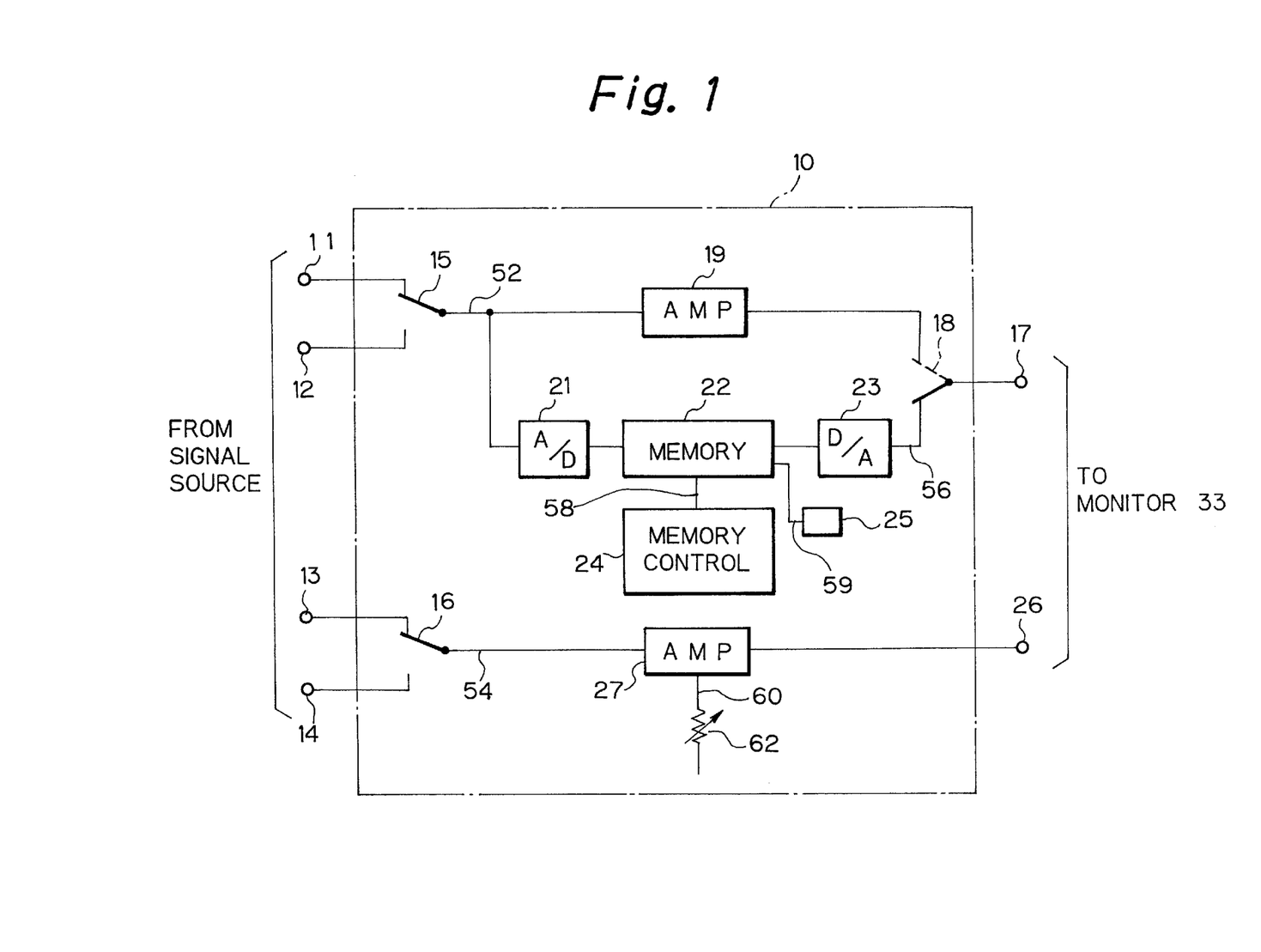
FIG. 1 is a block diagram schematically showing an embodiment of the video printer in accordance with the present invention.

Referring to FIG. 1 of the drawings, a video printer embodying the present invention is shown and generally designated by the reference numeral 10. The video printer is connectable to a picture signal source, not shown, to print an image represented by a video signal from the signal source on a recording medium, e.g., a thermosensitive paper or a plain paper. The picture signal source may be implemented as a TV monitor or receiver, video camera, or LD player by way of example, as will be described later with reference to FIG. 2. In the figure, constituent parts not directly relevant to the understanding of the illustrative embodiment are not shown for simplicity. In the following description, signals are each designated by the same reference numeral as a connection line on which it appears.

As shown in FIG. 1, the video printer 10 has two video input terminals 11 and 12 and two audio input terminals 13 and 14. The video input terminal 11 and audio input terminal 13 are removably connected to a picture signal source of one kind via a connector while the video input terminal 12 and audio input terminal 14 are removably connected to a picture signal source of another kind via a connector. The video input terminals 11 and 12 each play the role of a video signal input port for receiving a video signal from the associated picture signal source. For example, the video input terminals 11 and 12 may receive a video signal constituted by three separated color signals R, G and B, or a composite NTSC (National Television Standard Committee) video signal. On the other hand, the audio input terminals 13 and 14 each plays the role of an audio signal input port for receiving an audio signal associated with the video signal which is applied to the video input terminal 11 or 12.

Figure 3:
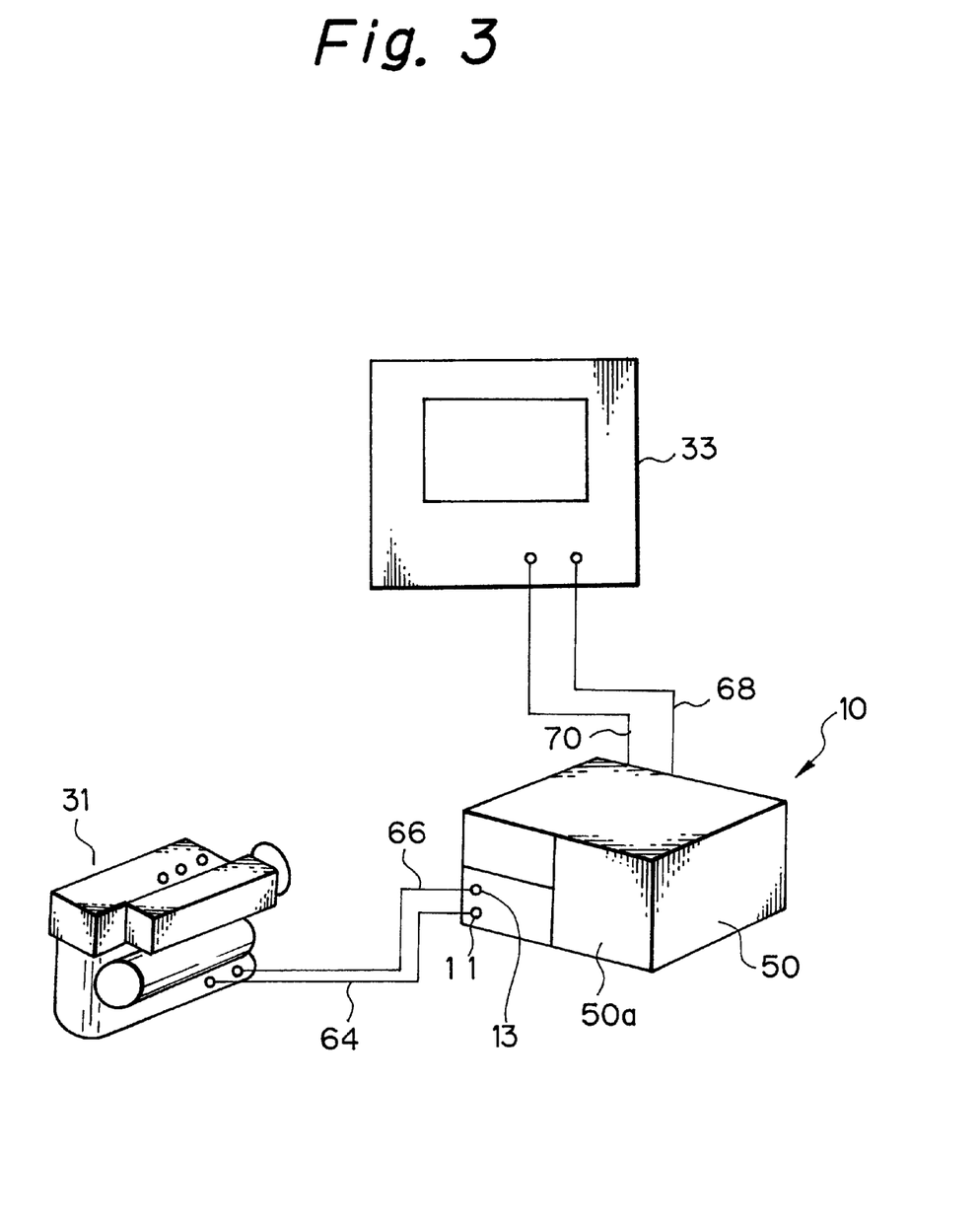
FIG. 3 is a view showing an example of connection of the video printer of FIG. 1 with another equipment.

The video input terminals 11 and 12 are connected to a selector or switch 15 while the audio input terminals 13 and 14 are connected to a selector or switch 16. As shown in FIG. 3, the video printer 10 has a housing 50. In the illustrative embodiment, the paired video input terminal 11 and audio input terminal 13 should preferably be provided on the front end 50*a* of the housing 50 which is expected to face the operator of the video printer 10. The video input terminal 12 and audio input terminal 14 are provided on the rear end of the housing 50 opposite to the front end 50*a*. The selectors 15 and 16 are operated in interlocked relation in response to the operator's manipulation or command. The selector 15 selects either of the NTSC or similar video signals coming in through the input terminals 11 and 12 and produces it on an output terminal 52 thereof. Likewise, the selector 16 selects either of the audio signals appearing on the input terminals 13 and 14 and produces it on an output terminal 54 thereof. The output terminal 52 of the selector 15 is connected to one input terminal of another selector 18 via a video amplifier (AMP) 19.

The video AMP 19 is an E—E mode amplifier and amplifies the video signal from the selector 15 to an input level particular to a TV monitor or similar equipment 33 which uses the video printer 10. The amplified video signal is delivered to the selector 18. The video AMP 19 is not essential in the illustrative embodiment, i.e., the output 52 of the selector 15 may be directly connected to one input of the selector 18. The selector 18 is connected to a video signal output terminal 17 provided on the printer 10. In response to the operator's manipulation or command, the selector 18 also selectively assumes either of two positions indicated by a solid line and a phantom line in the figure. In the phantom line position, the selector 18 selects the video AMP 19 and feeds it to the video signal output terminal 17. In the solid line position, the selector 18 selects the a digital-to-analog converter (DAC) 23, which will be described, and delivers it to the video signal output terminal 17. The TV monitor or similar equipment 33 is connected to the video signal output terminal 17, In this configuration, an image from the picture signal source or an image stored in a memory 22, which will be described, can be displayed on the TV monitor 33, depending on the position of the selector 18.

The output 52 of the selector 15 is also connected to an analog-to-digital converter (ADC) 21 which is in turn connected to the above-mentioned memory 22. The memory 22 is connected to the DAC 23 whose output 56 is connected to the other input of the selector 18. The ADC 21 transforms the R, G and B signals from the selector 15 to corresponding digital video data and feeds the digital data to the memory 22. In the illustrative embodiment, the memory 22 has a capacity great enough to rewritably store one frame of video data. A memory control 24 is connected to the memory 22 by a control line 58. The memory 22 has an output 59 connected to a thermal head, or thermal recording device, 25 which prints video data read out of the memory 22 on a recording medium. In this embodiment, the thermal head 25 forms an image directly on a thermosensitive paper by heat or forms it on a plain paper by transferring ink to the paper from an ink ribbon.

The memory control 24 connected to the memory 22 has some different functions, as follows. The memory control 24 controls the writing and reading of video data out of the memory 22, i.e., reads video data out of the memory 22 in synchronism with synchronizing signals included in a TV signal while delivering them to the DAC 23. Also, the memory control 24 reads the video data one print line at a time and feeds them to the thermal head 25. Further, the memory control 24 is capable of changing the tone, tint and contrast of an image represented by the video data, as commanded by the operator. The DAC 23 converts the video data from the memory 22 to corresponding analog R, G and B signals and delivers the analog color signals to the selector 18.

An audio AMP 27 is connected to the output 54 of the selector 16 which is turn connected to the audio input terminals 13 and 14. The audio AMP 27 is connected to an audio output terminal 26 also provided on the printer 10. Also implemented as an E—E mode amplifier, the audio AMP 27 selectively amplifies or mutes an audio signal from the selector 16 while delivering the resulting signal to the TV monitor 33 via the audio output terminal 26. The AMP 27 has a gain control terminal 60 to which a variable resistor 62 is connected for adjusting the gain of the audio AMP 27. While the AMP 27 and circuitry associated therewith are interposed between the audio input terminals 13 and 14 and the audio output terminal 26, the input terminals 13 and 14 and output terminal 26 may be directly connected via the selector 16 without the intermediary of the AMP 27 and associated circuitry, if desired. Further, even a single video input terminal and a single audio input terminal, e.g., only the terminals 11 and 13 suffice. In such a case, the selectors 15 and 16 will be omitted to connect the terminals 11 and 13 directly to the video AMP 19 and the audio AMP 27, respectively.

Figure 2:
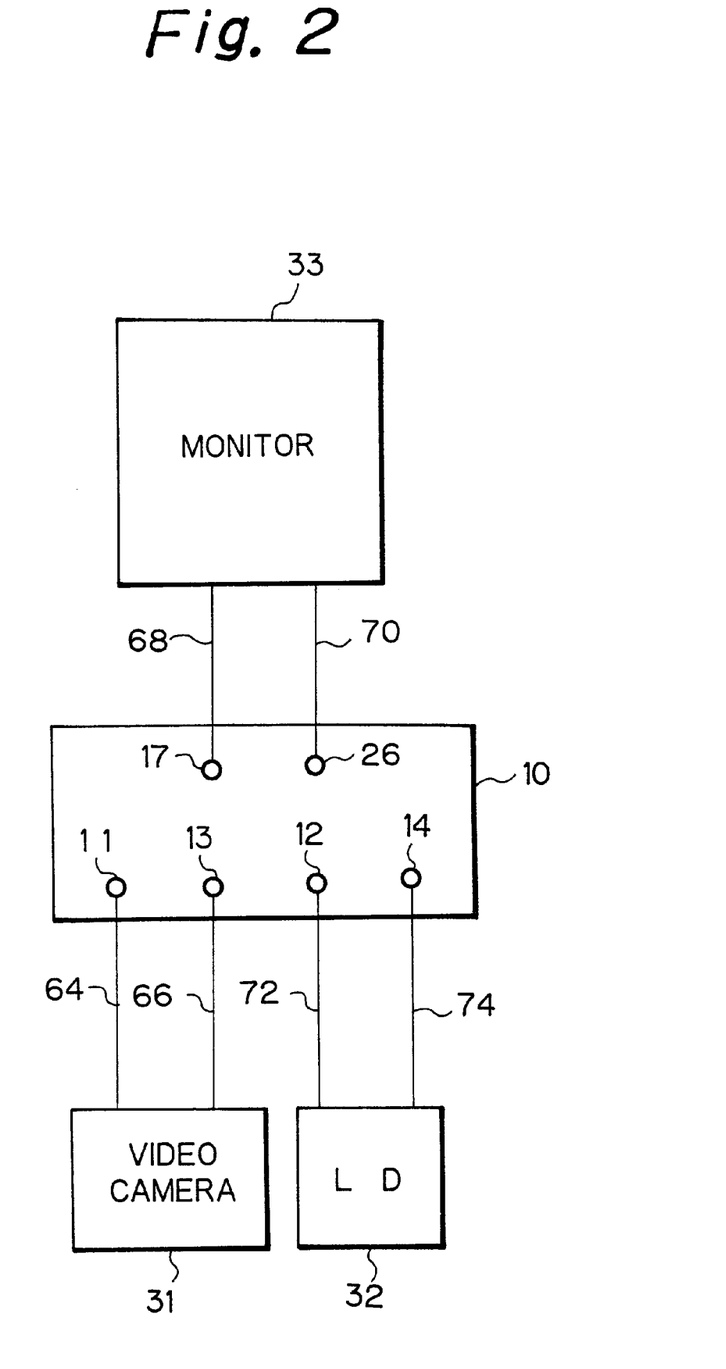
FIG. 2 is a schematic block diagram showing an example of connection of the video printer shown in FIG. 1 with other equipment.

The video printer 10 having the above construction may be connected to other equipment, as shown in FIGS. 2 and 3 specifically. As shown, a video camera 31 which is a specific picture signal source has outputs thereof connected to the video input terminal 11 and audio input terminal 13 of the printer 10 by cables 64 and 66, respectively. In the illustrative embodiment, the input terminals 11 and 13 are provided on the front end 50*a* of the housing 50. An LD player 32, FIG. 2, which is another specific picture signal source has outputs thereof connected to the video input terminal 12 and audio input terminal 14 by cables 72 and 74, respectively. These input terminals 12 and 14 are provided on the rear end of the housing 50. The TV monitor 33 has inputs thereof connected to the video output terminal 17 and audio output terminal 26 by cables 68 and 70, respectively. The terminals 17 and 26 are also provided on the rear end of the housing 50.

The operation of the video printer 10 will be described with reference to FIGS. 1 3. A video signal and an audio signal generated by the video camera, or picture signal source, 31 are respectively applied to the video input terminal 11 and the audio input terminal 13 of the video printer 10. Assume that the video printer 10 is simply left unoperated. Then, the selectors 15 and 16 select respectively the video input terminal 11 and the audio input terminal 13 by way of example, as shown in FIG. 1. At the same time, the selector 18 assumes a position indicated by a phantom line in FIG. 1, selecting the output of the video AMP 19. In this condition, the video signal coming in through the video input terminal 11 is fed to the video AMP 19 via the output 52 of the selector 15 to be amplified to a predetermined level thereby. The amplified video signal from the AMP 19 is delivered to the video output terminal 17 via the selector 18 and then to the video input terminal of the TV monitor 33 over the cable 68. On the other hand, the audio signal arrived at the audio input terminal 13 is fed to the audio AMP 27 via the output 54 of the selector 16 to be amplified to a predetermined level thereby. The amplified audio signal is delivered to the audio input terminal of the TV monitor 33 via the audio output terminal 26 and cable 70. As a result, a picture represented by the video signal is displayed on the TV monitor 33 while sound represented by the audio signal is produced from the monitor 33.

Assume that the operator manipulates a control section, not shown, provided on the video printer 10, e.g., presses a freeze button, not shown, for storing the video signal from the video camera 31 in the memory 22. Then, the analog video signal input through the video input terminal 11 is digitized by the ADC 21, and one frame of the resulting digital video data is written to the memory 22. In this condition, the operator of the video printer 10 may operate the control section, not shown, to correct tonality or otherwise process the image represented by the image data via the memory control 24. Subsequently, as the operator presses, for example, a print button, not shown, the video data is read out of the memory 22 under the control of the memory control 24 and fed to the thermal head 25. In response, the thermal head 25 prints out the image data on a recording medium.

In the above condition, if the selector 18 has selected the output of the video AMP 19, as indicated by a phantom line in FIG. 1, the analog video signal is directly sent to the TV monitor 33 via the AMP 19. Conversely, if the selector 18 has selected the output of the DAC 23, as indicated by a solid line in FIG. 1, the video data representative of a still picture and read out of the memory 22 is again converted to a corresponding analog signal by the DAC 23 and then sent to the TV monitor 33. By switching the selector 18 as stated above, it is possible to selectively display the image represented by the video signal from the picture signal source or the image represented by the video data stored in the memory 22 on the TV monitor 33, as desired. Therefore, the operator intending to reproduce the image stored in the memory 22 can adjust the tonality and other factors of the picture to be printed by the video printer 10 while examining them on the TV monitor 33.

As stated above, the cable connection and terminal arrangement of the illustrative embodiment allow the video camera, or picture signal source, 31, LD player 32, video printer 10 and TV monitor 33 to be sequentially mounted on a single rack according to the signal input order and then connected together by audio and video cables of substantially the same and shortest possible length.

Figure 4:
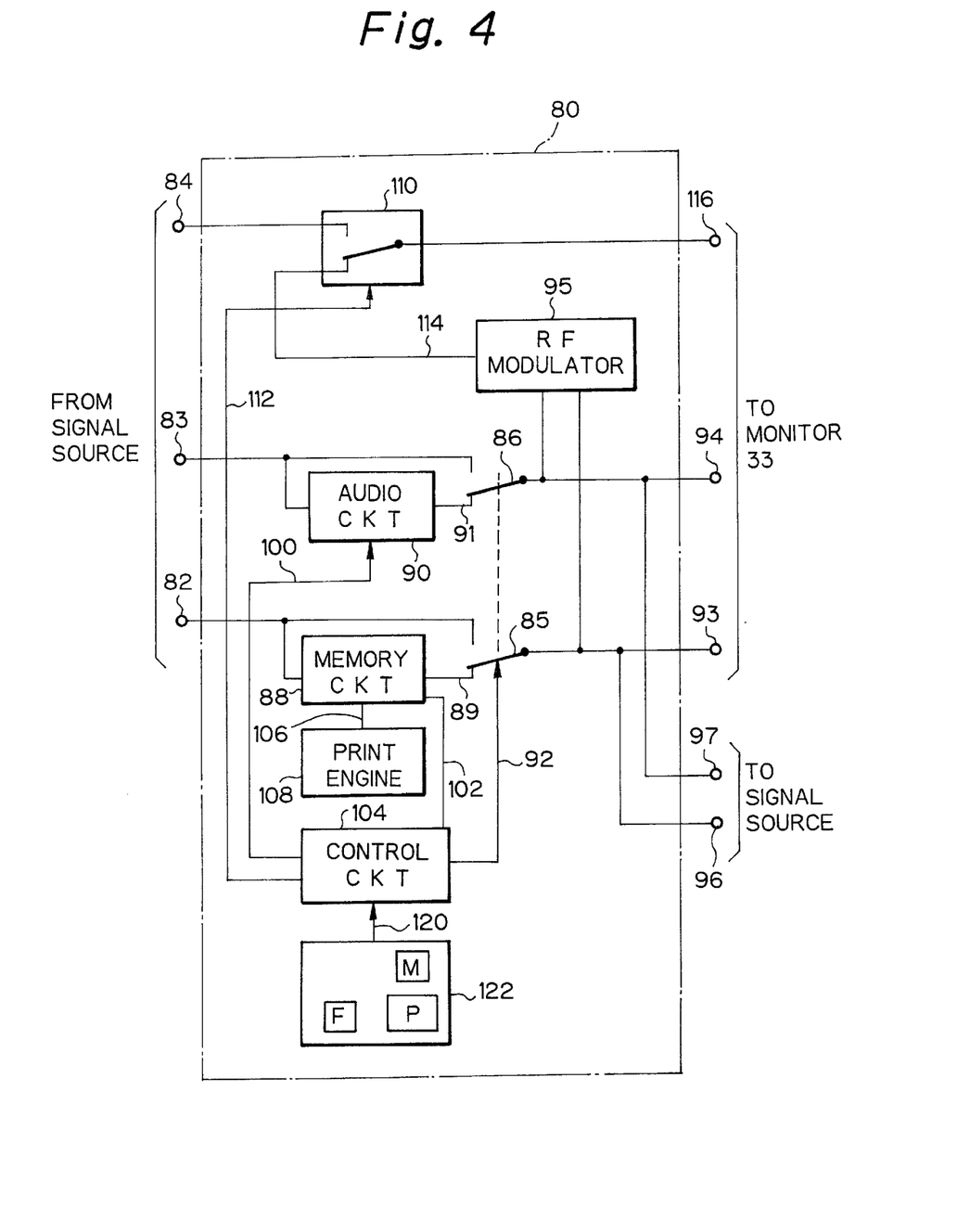
FIG. 4 is a block diagram schematically showing an alternative embodiment of the video printer in accordance with the present invention.
Figure 5:
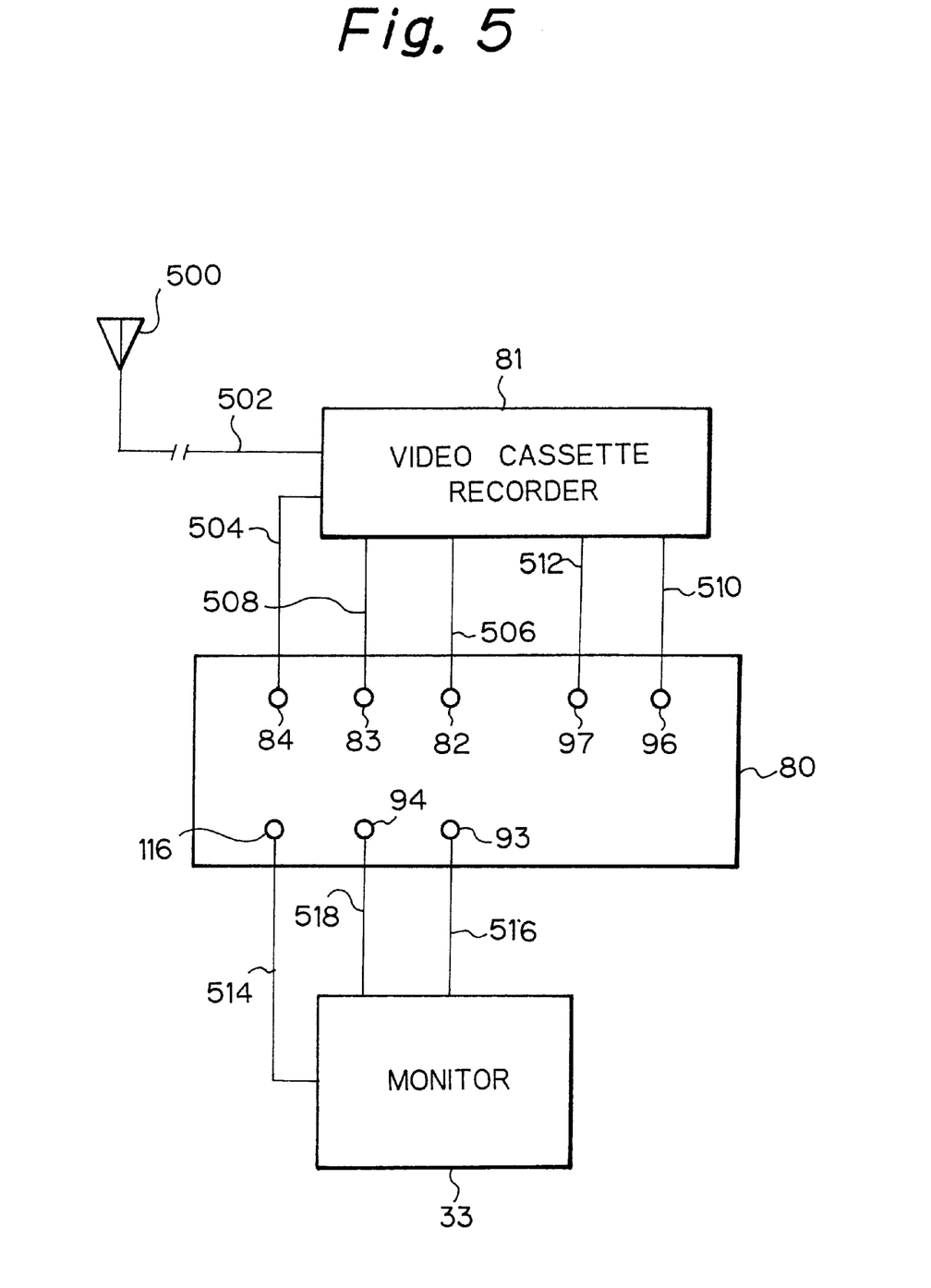
FIG. 5 is a schematic block diagram representative of an example of connection of the video printer shown in FIG. 4 with other equipment.

Referring to FIG. 4, an alternative embodiment of the video printer in accordance with the present invention will be described. This embodiment, like the previous embodiment, is used to print a picture generated by a picture signal source on a thermosensitive paper, plain paper or similar recording medium to produce a hard copy. As shown in FIG. 5, the picture signal source is implemented by a video cassette recorder 81 by way of example. It is to be noted that in FIG. 4 the functions not directly relevant to the understanding of the embodiment are not shown for simplicity. The video printer, generally 80, has a video input terminal 82, an audio input terminal 83, and an RF (Radio Frequency) input terminal 84 to be connected to the picture signal source.

Specifically, the video input terminal, or video signal input port, 82 is removably connected to the picture signal source by a connector, not shown, to receive a video signal. The video input terminal 82 is directly connected to one input of a selector 85 and, at the same time, connected to the other input 89 of the selector 85 via a memory circuit 88.

The audio input terminal, or audio signal input port, 83 is also removably connected to the picture signal source by a connector, not shown, to receive an audio signal associated with the video signal. The audio input terminal 83 is directly connected to one input of a selector 86 and, at the same time, connected to the other input 91 of the selector 86 via an audio circuit 90. The selectors 85 and 86 are interlocked with each other, and each selects one of the associated two inputs in response to a control signal appearing on a control input 92.

When the video printer 80 is in an operable state, e.g., when a power source is turned on to feed a control signal to the control input 92, the selectors 85 and 86 select respectively the terminals 89 and 91, as shown in FIG. 4. When the control signal on the control input 92 disappears, e.g., when the power source is turned off, the selectors 85 and 86 are each brought into the opposite position, selecting the terminals 82 and 83, respectively. Then, the video input terminal 82 is connected to a video output terminal 93 by the selector 85 while the audio input terminal 83 is connected to an audio input terminal 94 by the selector 86. The outputs 93 and 94 of the selectors 85 and 86 each have two branches, i.e., a branch connected to an RF modulator 95 and a branch connected to another video output terminal 96 or another audio output terminal 97, as illustrated. The video output terminal 93 and audio output terminal 94 and the video output terminal 96 and audio output terminal 97 are output terminals for outputting a video signal and an audio signal from the video printer 80. As shown in FIG. 5 by way of example, the output terminals 93 and 94 are connected to the TV monitor 33 while the output terminals 96 and 97 are connected to the inputs of the previously mentioned video cassette recorder 81.

The memory circuit 88 mentioned previously is used to store a video signal input to the video input terminal 82. In the illustrative embodiment, the memory circuit 88 has an ADC, not shown, at the input thereof for transforming an analog video signal to digital video data. One frame of the resulting video data is sequentially stored in the memory circuit 88. Also, the memory circuit 88 has a DAC, not shown, for reconverting the digital video data sequentially read out to an analog video signal. The memory circuit 88 produces the analog video signal on an output 89 thereof. A control circuit 104, which will be described, is connected to one in put 102 of the memory circuit 88. When video data representative of character information or similar on-screen display signal appears on the input 102, the memory circuit 88 mixes it with the video data written thereto via the video input terminal 82 and reads out the composite video data. Further, in response to a command entered by the operator, the memory 88 corrects the tone and tint or otherwise processes the picture represented by the video data stored therein under the control of the control circuit 104.

A print engine 108 is connected to one output 106 of the memory circuit 88. Under the control of the control circuit 104, the memory circuit 88 reads out the video data and delivers a video signal corresponding to the video data to the print engine 108. In response, the print engine 108 prints the image represented by the video signal appearing on the input 106 on a recording medium, e.g., a thermosensitive paper or a plain paper. Implemented by a thermal transfer type printing system, for example, the print engine 108 executes predetermined color conversion with input picture data and then feeds a drive signal based on the processed picture data to a thermal head, not shown. As a result, a picture represented by the picture data is printed on a thermosensitive paper. Alternatively, an ink layer formed on an ink ribbon may be transferred to a plain paper or an exclusive paper processed for recording a picture by heat. Of course, such a thermal transfer type printing system may be replaced with an ink jet printing system or a silver hallide type photographic system, if desired.

The audio circuit 90 receives a control signal from the control circuit 104 via a control input 100 thereof. In response, the audio signal 90 mixes an audio signal come in through the audio in put terminal 83 with a tone represented by the control signal. For example, the control signal is representative of an acknowledge tone indicating an operator's manipulation on the video printer 80 accepted, an alarm tone indicating an erroneous operation, or an error tone representative of a paper jam. The audio circuit 90 generates an audio signal representative of such a tone, mixes it with the audio signal applied thereto via the audio input terminal 83, and then produces the composite audio signal on the output 91 thereof. In addition, the audio circuit 90 is capable of muting the audio signal appearing on the audio input terminal 83 in response to the control signal on the control input 100. For example, while a still or frozen picture represented by the video signal from the memory circuit 88 is displayed on the TV monitor 33 during printing, the control signal from the control circuit 104 may cause the audio signal 90 to mute the audio signal.

The RF input terminal 84 is removably connected to the picture signal source by a connector, not shown. With the RF input terminal or RF signal input port 84, the video printer 80 is capable of receiving the above-described video signal and audio signal in the form of radio frequency or high frequency signals so modulated as to be received on a predetermined channel of a TV receiver. The RF input terminal 84 is connected to one input of a switching circuit 110. Connected to the other input of the switching circuit 110 is the output 114 of the RF modulator 95. The switching circuit 110 selects either of the two inputs as instructed by a control signal fed to a control input 112 thereof from the control circuit 104. The control signal 112 is responsive to, for example, the operator's manipulation on the video printer 80. The switching circuit 110 selects one of the two inputs as indicated by the control signal 112 and delivers the corresponding RF signal to an RF output terminal 116. For example, assume that the switching circuit 110 is brought to a condition for connecting the RF input terminal 84 to the RF output terminal 116, i.e., a condition opposite to the condition shown in FIG. 4. Then, the RF signal from the RF input terminal 84 is delivered to the RF output terminal 116 which is connected to, for example, the antenna input terminal of the TV monitor 33, FIG. 5. As a result, if the TV monitor 33 is of the type receiving an RF signal, a picture represented by the RF signal is displayed on the screen of the monitor 33 while sound is produced from the monitor 33.

The RF modulator 95 modulates the video signal and the audio signal appearing on the inputs 85 and 86 thereof, respectively. The RF modulator 95 transforms the input video signal and audio signal to RF signals matching a desired channel which lie in the VHF or UHF band of a TV broadcast system. For example, the RF modulator 95 modulates the video signal by amplitude modulation and modulates the audio signal by frequency modulation. The modulated audio signal and video signal are each carried by respective carrier wave, whereby RF signals each having a particular high frequency are generated. The RF modulator 95 produces the resulting RF signals on the output 114 thereof which is connected to one input of the switching circuit 87.

The control circuit 104 controls the entire video printer 80 to effect printing of an image, switch over circuit operations, and execute other various kinds of processing. Specifically, an operating section 122 is connected to the input 120 of the control circuit 104 to identify information representative of an operator's manipulation. The operating section 122 includes, for example, a freeze button (F), a print button (P), and a monitor button (M), as illustrated. The freeze button (F) may be pressed to store the video signal applied to the input terminal 82 in the memory circuit 88. The print button (P) is used to print a picture represented by the video data stored in the memory circuit 88. Further, the monitor button (M) is accessible for selecting one of the video signals to be fed to the video output terminal 93. The operating section 122 delivers information representative of one of the buttons pressed to the control circuit 104.

The control circuit 104 controls the various sections constituting the video printer 80 on the basis of the information supplied from the operating section 122. For example, when the power source of the video printer 80 is turned on, the control circuit 104 produces on the output 92 a signal for causing the selectors 85 and 86 to select respectively the memory circuit 88 and the audio circuit 90, as shown in FIG. 4. At the same time, the control circuit 104 produces on the output 112 a signal for causing the switching circuit 110 to select the RF modulator 95, as also shown in FIG. 4.

On receiving the information from the operating section 122, the control circuit 104 produces on the output 100 a control signal representative of an acknowledge tone indicating an operator's manipulation on the video printer 80 accepted, an alarm tone indicating an erroneous operation, or an error tone reporting an error occurred in the printer 80. Further, the control circuit 104 generates on the output 100 a control signal for deactivating the audio circuit 90 during the course of printing, thereby muting the audio signal otherwise outputted from the audio output terminal 94. In addition, the control circuit 104 generates video data for displaying on-screen characters on the TV monitor or similar equipment 33 connected to the video output terminal 93 or the RF output terminal 116 and produces the data on the output 92. The on-screen characters are representative of a message to be communicated from the video printer 80 to the operator, e.g., an operating state of the printer 80 or an operation guide. The output of the control circuit 104 is connected to the memory circuit 88, so that the memory circuit 88 stores the video data fed from the control circuit 104.

FIG. 5 shows specific connection of the video printer 10 and the other equipment. The video cassette recorder, or picture signal source, 81 is stationary equipment for reproducing an image. An antenna 500 is connected to the RF input of the video cassette recorder 81 by, for example, a coaxial cable 502 and receives a TV broadcast wave. The recorder 81 delivers the TV broadcast wave or RF signals representative of a picture and sound reproduced from a video tape to a coaxial cable 504 connected to the RF output thereof. Also, the recorder 81 produces the video signal representative of the picture on a signal cable 506 and the audio signal representative of the sound on a cable 508. The cables 506 and 508 are each connected to a particular output of the recorder 81, as illustrated. The coaxial cable 504 is connected to the RF input terminal 84 of the video printer 80 while the signal cables 506 and 508 are connected to the video input terminal 82 and the audio input terminal 83, respectively. The video output terminal 96 and the audio output terminal 97 of the video printer 80 are respectively connected to a video input and an audio input provided on the recorder 81 by signal cables 510 and 512. The RF output terminal 116 of the video printer 80 is connected to an antenna input terminal provided on the TV monitor 33 by a coaxial cable 514. Further, the video output terminal 93 and audio output terminal 94 are connected to associated input terminals of the TV monitor 33 by signal cables 516 and 518, respectively.

The operation of the video printer 80 having the above construction will be described with reference to FIGS. 4 and 5. While the power source of the video printer 80 is turned off, the selectors 85 and 86 and switching circuit 110 are each held in a condition opposite to the condition shown in FIG. 4. Hence, a video signal coming in through the video input terminal 82 is routed through the selector 85 to the video output terminals 93 and 96. At the same time, an audio signal arrived at the audio input terminal 83 is delivered to the audio output terminals 94 and 97 via the selector 86. Further, an RF signal applied to the RF input terminal 84 is transferred to the RF output terminal 116 via the switching circuit 110.

As the power source of the video printer 80 is turned on, the control circuit 104 sends a control signal to the selectors 85 and 86 via the output 92 to bring them into the conditions shown in FIG. 4. Also, the control circuit 104 delivers a control signal to the switching circuit 110 via the output 112 to cause it to assume the position shown in FIG. 4. A video signal and an audio signal from the video cassette recorder, or picture signal source, 81 are respectively applied to the video input terminal 82 and the audio input terminal 83 of the video printer 80. Further, RF signals representative of the video and audio signals are applied to the RF input terminal 84 of the video printer 80.

So long as the operating section 122 is left unoperated, the analog video signal from the video input terminal 82 is sequentially stored in the memory circuit 88 in the form of digital video data. The video data are sequentially read out of the memory circuit 88 while being converted to an analog video signal. This video signal on the output 89 of the memory circuit 88 is delivered to the video output terminals 93 and 96 and RF modulator 95 via the selector 85. The video signal is transferred to the TV monitor 33 connected to the video output terminal 93. As a result, a picture represented by the video signal is displayed on the screen of the TV monitor 33. At this instant, video data representative of on-screen characters is generated on the output 102 of the control circuit 104 and stored in the memory circuit 88. The video data representative of on-screen characters may preferably provide the operator with a message indicating, for example, how to operate the video printer 80. The video signal from the video input terminal 82 and the video data from the control circuit 104 are mixed together in the memory circuit 88, read out of the circuit 88, and then fed to the video output terminals 93 and 96 and RF modulator 95 via the selector 85. The composite video data on the video output terminal 93 is sent to the TV monitor 33 with the result that a picture represented by the video data is displayed on the monitor 33.

On the other hand, the audio signal applied to the audio input terminal 83 is routed through the audio circuit 90 and selector 86 to the audio output terminals 94 and 97 and RF modulator 95. The RF modulator 95 modulates each of the video signal and audio signal by a particular modulation system to produce a composite RP signal on the output 114 thereof. The RF signal is delivered to the RF output terminal 116 via the switching circuit 110.

Assume that the operator has manipulated the operating section 122, e.g., pressed the freeze button (F). Then, the operating section 122 sends information representative of the manipulation to the control circuit 104. On receiving this information, the control circuit 104 sends a control signal to the audio circuit 90 via the output 100 thereof to cause it to generate a signal representative of an operation tone. In response, the audio circuit 90 generates an audio signal representative of an audible sound, e.g., an acknowledge tone. This audio signal is mixed with the audio signal from the audio in put terminal 83. The audio signal is sent to, for example, the TV monitor 33 connected to the audio output terminal 94 via the output 91 of the audio circuit 90. As a result, an audio circuit built in the TV monitor 33 produces an acknowledge tone from the monitor 33. Further, when the freeze button (F) is pressed, the writing of video data in the memory circuit 88 is interrupted as soon as one frame of video data has been written in the circuit 88. The one frame of video data is repetitively read out of the memory circuit 88 while being sent to the TV monitor 33 via the output 89 of the circuit 88. Consequently, a still or frozen picture represented by the video data of the memory circuit 88 is displayed on the screen of the TV monitor 33. At this instant, the audio circuit 90 is controlled by the control circuit 104 to mute the sound otherwise produced from the TV monitor 33.

As the operator presses, for example, the print button (P) on the operating section 122 while the still picture is displayed on the TV monitor 33, information representative of the operation is sent from the operation section 122 to the control circuit 104. In response, the control circuit 104 causes the audio circuit 90 to generate an audio signal representative of an acknowledge tone. As a result an acknowledge tone is produced from the TV monitor 33. The video data stored in the memory circuit 88 is sent to the print engine 108 and printed on a thermosensitive paper, plain paper or similar recording medium.

When the operator presses the monitor button (M) also provided on the operating section 122, the section 122 informs the control circuit 104 of the manipulation performed. Then, the control section 104 delivers a control signal to the selectors 85 and 86 via the output 92 thereof so as to switch them to positions opposite to the positions shown in FIG. 4. In this condition, the video signal applied to the video input terminal 82 is directly fed to the video output terminals 93 and 96 without the intermediary of the memory circuit 88. Likewise, the audio signal applied to the audio input terminal 83 is delivered to the audio output terminals 94 and 97, by-passing the audio circuit 90.

As stated above, while the power source of the video printer 80 is turned off or when the operator performs a predetermined operation on the video printer 80, the selectors 85 and 86 and switching circuit 110 are each brought into a position opposite to the position shown in FIG. 4. As a result, signals come in through the input terminals 82, 83 and 84 are simply delivered to the corresponding output terminals 93 (96), 94 (97) and 116 without being processed by the video printer 80. On the other hand, when the power source of the video printer 80 is turned on, the selectors 85 and 86 and switching circuit 110 are conditioned as shown in FIG. 4. Then, the signals on the input terminals 82, 83 and 84 are each routed to a particular processing circuit built in the video printer 80. Since messages from the video printer 80 can be mixed with the input video signal and audio signal, the operator can readily recognize the current operating state of the video printer 80. In addition, in the event of an erroneous operation or similar occurrence, an audible alarm can be produced from the equipment which uses the video printer 80.

Furthermore, when the video printer 80 is connected to the video cassette recorder or picture signal source 81 and the TV monitor or equipment to use the printer 80, the printer 80 intervenes between the recorder 81 and the monitor 33. Then, it is not necessary to connect the video cassette recorder 81 and TV monitor 33 directly to each other. It follows that AV cables for connecting such equipment and made up of video signal lines and audio signal lines can be implemented by cables of the same predetermined length.

In summary, it will be seen that the present invention provides a video printer which allows independent equipment to be connected thereto by short cables and, therefore, realizes orderly arrangement of cables when mounted on a single rack together with the equipment. Moreover, when a person desires to enjoy a picture and sound from a signal source on, for example, a TV monitor without using the video printer, it is not necessary for the person to rearrange the cable connection using connectors.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, the embodiments have been shown and described as having an audio input terminal, an audio output terminal, an RF input terminal and an RF output terminal as well as a video input terminal and a video output terminal. If desired, the video printer of the present invention may additionally be provided with input and output terminals for transferring control signals which allow each of the picture signal source and equipment to use the printer to execute control therein.

What is claimed is:

1. A video printer for recording a frame on a recording medium by receiving a first video signal from a signal source, the video printer comprising:
    a video signal input terminal connectable to the signal source for receiving the first video signal;
    an audio signal input terminal connectable to the signal source for receiving an audio signal from the signal source, the audio signal being generated in synchronism with and corresponding to the first video signal;
    a video signal output terminal connectable to equipment for using video information;
    an audio signal output terminal connectable to the equipment for selectively outputting audio information therefrom;
    an image memory circuit for storing a second video signal representative of a picture to record on the recording medium from the first video signal;
    a image printer for selectively printing the second video image obtained from said image memory;
    an audio circuit generating a state representative audio signal related to said second video signal;
    said audio circuit mixing said state representative audio signal with said audio signal from said signal source to facilitate recognition of the current operating state of said video printer.

2. The video printer according to claim 1 wherein the image memory circuit is adapted to freeze a frame of the second video signal, derived from the first video signal, without disabling the signal source, the memory circuit facilitating recording the frame on said recording medium.

3. The video printer according claim 2 wherein the audio signal output terminal selectively outputs either of a first and second audio signals on the audio signal input terminal and a second audio signal input terminal, respectively; the audio signal output terminal coupled to a muting circuit for muting at least one of the first and second audio signals during the freezing of the frame.

4. The video printer according to claim 1 wherein the video signal output terminal is associated with an outputting unit for selectively outputting either of the first and second video signals via said video output terminal.

5. The video printer according to claim 1 further comprising a modulated signal input terminal for receiving first modulated signals including the first video signal and the audio signal modulated from the signal source; and
    a modulated signal output terminal for outputting the first modulated signals applied to said modulated signal input terminal.

6. The video printer according to claim 1 wherein the audio circuit receives the audio signal from the audio signal input terminal, the audio circuit including a sound generator for generating the state representative audio signal, where the state representative audio signal is associated with an operator's manipulation performed on the video printer.

7. The video printer according to claim 1 wherein the image memory circuit is adapted to store the second video signal in a digital format, derived from the first video signal, the image memory circuit adapted to extract a frame of the second video signal, to record the frame on the recording medium.

8. The video printer according to claim 1 further comprising a switch assembly having a first connective state for coupling said image memory circuit to said video signal output terminal, and the switch assembly having a second connective state for coupling the video signal input terminal to the video signal output terminal, said audio circuit coupled between said audio signal input terminal and said audio signal output terminal, said audio circuit adapted to mute the audio signal while recording the frame on the recording medium during the second connective state.

* * * * *